Aug. 27, 1957          W. M. SUTTON          2,804,135
SCREEN FOR AUTOMOBILE WINDOW
Filed Jan. 6, 1954
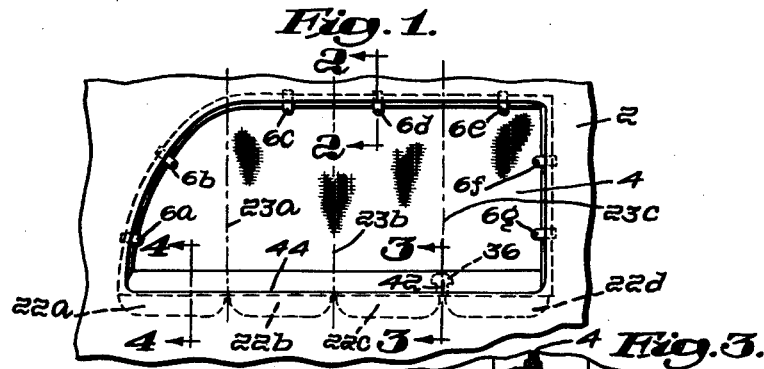
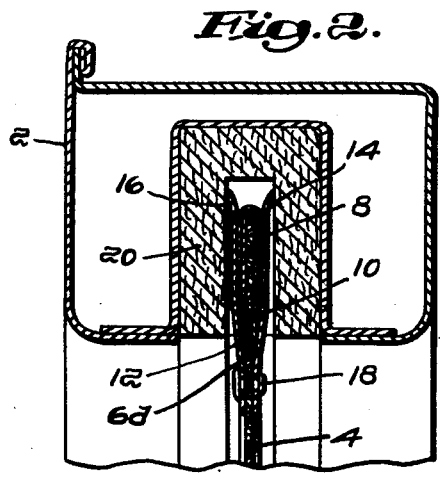
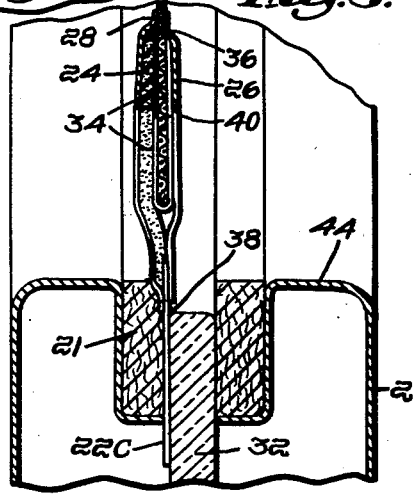
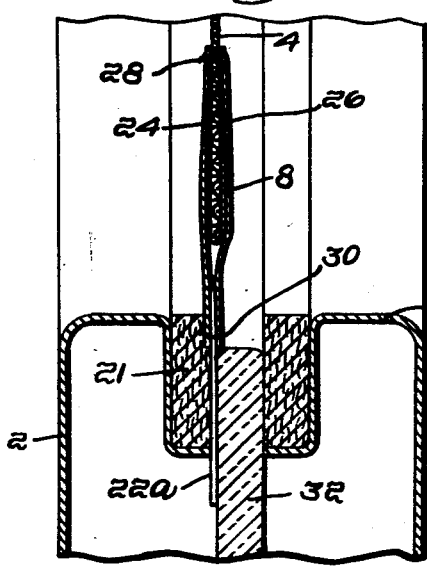
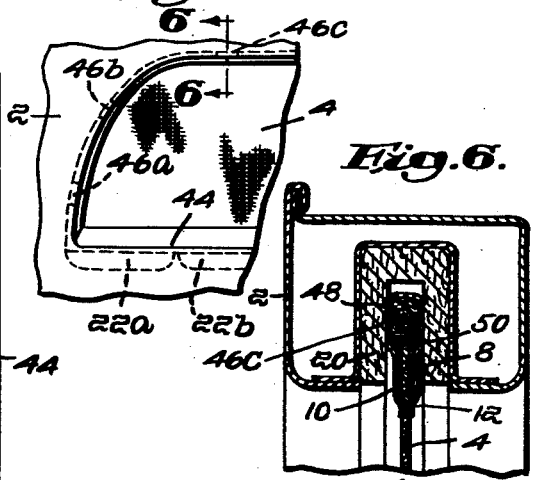
Inventor:
William M. Sutton,
by Yardley Chittick
Attorney

2,804,135
SCREEN FOR AUTOMOBILE WINDOW
William M. Sutton, Brockton, Mass.
Application January 6, 1954, Serial No. 402,521
1 Claim. (Cl. 160—105)

This invention relates to screens for automobile windows.

Heretofore as disclosed by the prior art, screens of various types have been constructed to be used in automobiles when the windows thereof are in open position. Some of the screens have been designed to be used when the automobile is being driven and hence have been of strong rigid construction capable of withstanding normal driving wind velocities. Other screens have been developed for purposes such as automobile camping trips in which the screens when not used are stored with the other camping gear.

It will be recognized however that in the ordinary automobile there is limited space in which to store screens, particularly if they are to be stored in a manner that will give them proper protection so that they will be maintained in proper condition ready for use. The result of the storage problem is that screens now available for automobiles have not come into use generally and are only utilized in particular occasions where the necessity is acute.

Accordingly, one of the objects of this invention is to provide a screen so constructed that it can be made secure to the frame of an open automobile window in a manner capable of maintaining it in position whether the car be stationary or in operation and which is also capable of being folded and rolled into a small package of such size that it may be stored in the glove compartment usually found on the dashboard.

Another object of the invention is to provide a removable automobile screen having no framework in the ends or top and bottom which may be inserted in the window frame while the user is in the car.

A further object of the invention is to provide a removable automobile screen having special characteristics which will permit its use when the car is parked in an outdoor moving picture theater. When so used, the cable of the loudspeaker ordinarily provided by the theater management may pass through the border of the screen through a special opening therethrough of such construction that the border will close tightly about the loudspeaker cable thereby preventing any entrance of insects at that point.

These and other objects of the invention will be more clearly understood as the description proceeds with the aid of the accompanying drawings in which Fig. 1 is a side elevation of an automobile window with the window in open position and the screen inserted.

Fig. 2 is a vertical section on the line 2—2 of Fig. 1 showing one type of clip used to secure the screen in the window channel.

Fig. 3 is a vertical section on the line 3—3 of Fig. 1 showing the slot through the lower part of the screen border through which a loudspeaker cable or other similar element may pass when the screen is in normal position.

Fig. 4 is a vertical section on the line 4—4 of Fig. 1 illustrating more particularly the manner of securing the lower edge of the screen in position in the window frame.

Fig. 5 is a fragmentary side elevation of a screen similar to that shown in Fig. 1, but utilizing a different type of securing element.

Fig. 6 is a vertical section on the line 6—6 of Fig. 5 showing in detail the nature of the modified form of securing element shown generally in Fig. 6.

Referring to Fig. 1, there is shown a window frame 2 of conventional construction and which represents any window of any automobile. It will be understood, of course, that the configuration of automobile windows varies and therefore the outline of each screen must be made to conform with the particular window with which it is to be used. However, the principles utilized in securing the screen to the window frame is the same in each case.

In Fig. 1 the window is open and the screen indicated at 4 has been secured in position by the utilization of a plurality of clips 6a, 6b, 6c, 6d, 6e, 6f and 6g. These clips are identical in construction and are shown more particularly in the vertical enlarged cross-sectional view in Fig. 2. In this view, the screening 4 which in the preferred construction will be of plastic or other flexible non-metallic material and which is generally available in the market has its outer edge covered first with a tape 8 which extends about the entire periphery of the screen. Over this tape on the top and ends is laid a wider binding 10 which is stitched to the screen as at 12.

A pair of metallic spring fingers 14 and 16 as shown in Fig. 2 are riveted together by the rivet 18 on opposite sides of the binding 10. The normal position of the spring fingers 14 and 16 will be such that the extremities of the fingers will be spread apart a distance greater than the interior width of the customary felt liner 20 or pile fabric liner that is generally used in automobile window frames to support the side and top edges of the automobile window when in closed position.

The bottom edge of the screen is constructed in slightly different fashion. As shown in Fig. 1, there are four thin flexible flaps 22a, 22b, 22c and 22d. These flaps are secured to the lower edge of the screen in closely adjacent position in the manner shown in Fig. 4. Here it will be seen that the screen 4 has along its lower edge the overlapping tape 8 and two separate pieces of binding 24 and 26 stitched to the screen at 28.

Between the lower edges of the bindings 24 and 26 is positioned the flexible flap 22a which flap is preferably made of a sheet of flexible, but relatively stiff plastic, and which is sewn to the flaps by the stitching 30. Flap 22a is wide enough and stiff enough to permit its being inserted between the side of the upper edge of the turned down window 32 and one side of the felt liner 21.

From the foregoing description it will be understood that various pliable types of leatherette and plastic bindings can be used about the edges of the screen and the clip structure may be varied as convenient so long as it has expandable elements capable of gripping the interior of the window channel with sufficient security for the purpose intended. The flaps or blades along the bottom of the screen are preferably of plastic to minimize the possibility of scratching the car finish. These plastic blades, however, could be replaced by other materials such as paper, cardboard, pressed board, sheet metal, or any other suitable sheet material.

The procedure used in inserting the screen in place in an open window is as follows: the user first inserts the blades 22a, 22b, 22c and 22d in position between the liner 21 and the side of the top of the window as shown in Fig. 4. Then clip 6a is squeezed together so that the compressed blades 14 and 16 may be inserted within the window channel formed by the felt liner 20. When in position the screen will then be supported from the bottom left corner upwardly as far as clip 6a and the edge of the binding 10 below clip 6a will be positioned a substantial distance within the window channel so that passage of bugs thereby will be impossible.

The user then proceeds to clip 6b, squeezes the blades 14 and 16 together and inserts this clip in the same manner, drawing the edge of the screen between the clip 6a and 6b tight and placing it in the corresponding portion of the window channel.

The clip 6c is then inserted and it will be found that there is sufficient rigidity in the screen and binding material to hold it in position in the window channel between the postion 6b and 6c. Clip 6d is then inserted so that the left hand portion of the screen is now in extended installed position. This leaves the upper right hand corner of the screen to be mounted and that can be done by proceeding to insert clips 6e, 6f and finally 6g. If any difficulty is found in inserting the clips from one side only of the screen, the user may open the docr and apply finger pressure to opposite sides of the clip by reaching over the door so as to use both hands in this operation.

With all of the clips in position and the flaps at the bottom installed as in Fig. 4, the screen will be securely held and the screen border at the ends and top will be in the window channel.

It is to be particularly noted that there is no frame work or supporting structure of any kind in the periphery of the screen other than the series of blades or tabs at the bottom. Since these tabs are flexible and are in a series, it will be readily understood that when the screen is removed from the window, it may be folded along vertical lines 23a, 23b and 23c between any two of the bottom blades to make a package no wider than the width of one blade, which, in a typical window, may be from six to eight inches. When in this folded position, the screen may then be rolled up about a horizontal axis using the folded superimposed blades as the core of the roll. A screen folded in this manner has dimensions of about six to eight inches long, four inches wide and an inch and a half thick and is small enough to be placed in the glove compartment. In fact, there is room enough in the ordinary glove compartment for placing therein a number of screens.

When the screen is used at a drive-in motion picture theater the following described construction makes it possible for the loud speaker lead-in wire to be brought through the window into the car so that the loud speaker may be located in the proximity of the car passengers.

As shown in Figs. 1 and 3, the bindings 24 and 26 have inserted thereunder for a short distance either side of the juncture of blades 22c and 22d a piece of sponge rubber 34 which is secured by the stitching 36 shown in Fig. 1 to the interior of the binding 24. The bindings 24 and 26 and the sponge rubber 34 are then slit upwardly from their lower edges as at 38 to the point 40 which slit is indicated at 42 in Fig. 1. This slit obviously has a degree of flexibility so that prior to the insertion of screen in the window, the loud speaker cord can be passed upwardly between the blades 22c and 22d to enter into slit 42 where the wire will be griped and surrounded on both sides by the sponge rubber 34. The cord when thus positioned will be at a location above the top edges of the blades 22c and 22d and hence when the screen is inserted in position in the window, the cord will be above the top of the window sill indicated at 44 in Figs. 1, 3 and 4.

After the loud speaker wire has been positioned in the bottom of the screen in the manner just described, the screen may then be inserted in the window following the procedures previously set forth.

A modified type of means for securing the screen in the window channel is shown in Figs. 5 and 6. In this construction the screen has the same flaps 22a, 22b etc. as described above but the clips 6 have been replaced by a plurality of interiorly positioned wedges 46a, 46b, 46c, etc.

Referring to Fig. 6, the construction of the unit 46c is shown in more detail. The screen 4 is covered in the usual manner with the tape 8 about its edge. Additionally over the screen edge is placed a U-shaped rubber element 48 of relatively short length which is secured to the tape and screen by the stitching 50. This rubber element and the screen are then covered by the binding 10 which is stitched to the screen at 12 in the manner previously explained.

The over-all lateral dimension of the element 48 and the two thicknesses of the binding 10 on either side thereof is such that it will fit snugly within the confines of the window channel liner 20. When this construction is used, the blades 22a, etc. are inserted in the manner previously explained in the bottom of the window between the glass and felt liner and then the securing elements 46a, 46b, 46c etc. are merely pushed within the channel 20 where they will be frictionally held in a manner adequate to maintain the screen in proper mounted position.

From the foregoing descritpion it will be understood that I have provided a screen and means for securing it in an automobile window, which screen completely lacks any supporting framework, permitting the screen, when removed from the window to be folded and rolled so that it may be stored in a small space. Any type of screening that is sufficiently flexible for the purpose may be used and any type of clip or other device used for securing the edge of the screen in the window channel may be utilized. If the lower blade material is sufficiently flexible to permit it to be folded then the blades 22a, etc. may be made in one continuous piece provided, of course, that the material is of sufficiently stiffness to enable it to be inserted between the top of the turned-down window and the felt liner as shown in Fig. 4.

It is my invention to cover all changes and modifications of the example of the invention herein chosen for purposes of the disclosure which do not constitute departures from the spirit and scope of the invention.

I claim:

A foldable window screen for use in an automobile in which the window has been moved to open position and adapted to have its periphery positioned in the window channel that normally receives the window, said screen comprising screening of non-metallic flexible material bound about its edges by flexible material, a plurality of elements for securing said screen in said channel, said elements being attached to said flexible material at spaced intervals along the sides and top of the screen and lying in the plane of said screening whereby when said elements are in secured position in said channel said screen will be in the plane normally occupied by the window, said elements being compressible in a direction normal to the screen with an uncompressed dimension greater than the corresponding dimension of said channel but compressible to a lesser dimension whereby they may be inserted in said channel and upon release will act to secure said screen in position, and a plurality of flexible blades secured to the lower edge of said screen, said blades adapted to be positioned between the lowered window and adjacent frame and when so positioned to lie in the plane of said screen and to secure the bottom of said screen in closed position, the construction being such that said screen may be folded into a small compact unit.

References Cited in the file of this patent

UNITED STATES PATENTS

| | | |
|---|---|---|
| 1,796,148 | Greenblatt | Mar. 10, 1931 |
| 2,092,914 | Griest | Sept. 14, 1937 |
| 2,595,833 | Flaherty | May 6, 1952 |
| 2,615,515 | Hoffman | Oct. 28, 1952 |
| 2,619,168 | Teverence | Nov. 25, 1952 |
| 2,643,711 | Smith | June 30, 1953 |
| 2,665,754 | Claussen et al. | Jan. 12, 1954 |